United States Patent
Bollman et al.

(10) Patent No.: US 10,401,885 B2
(45) Date of Patent: Sep. 3, 2019

(54) DC TO DC CONVERTER OUTPUT BUS VOLTAGE CONTROL SYSTEM

(71) Applicant: Rolls-Royce North American Technologies Inc., Indianapolis, IN (US)

(72) Inventors: Andrew Bollman, Plainfield, IN (US); Eric Duane Schneider, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 16/044,486

(22) Filed: Jul. 24, 2018

(65) Prior Publication Data

US 2019/0056757 A1 Feb. 21, 2019

Related U.S. Application Data

(60) Provisional application No. 62/547,508, filed on Aug. 18, 2017.

(51) Int. Cl.
| | |
|---|---|
| *G05F 1/10* | (2006.01) |
| *H02P 9/10* | (2006.01) |
| *H02M 3/07* | (2006.01) |
| *H02M 3/156* | (2006.01) |
| *H02M 1/00* | (2006.01) |

(52) U.S. Cl.
CPC .............. *G05F 1/10* (2013.01); *H02M 3/07* (2013.01); *H02M 3/156* (2013.01); *H02M 3/1563* (2013.01); *H02P 9/10* (2013.01); *H02M 2001/0006* (2013.01); *H02M 2001/0025* (2013.01); *H02M 2003/1566* (2013.01)

(58) Field of Classification Search
CPC .............. H02M 1/4225; H02M 3/156; H02M 3/33561; Y02B 70/126
USPC .... 363/35–40, 44–47, 78, 95; 323/272, 280, 323/285–290
See application file for complete search history.

(56) References Cited

U.S. PATENT DOCUMENTS

| | | | | |
|---|---|---|---|---|
| 5,404,092 A | * | 4/1995 | Gegner | H02M 1/4208 323/207 |
| 5,563,802 A | * | 10/1996 | Plahn | H02J 9/062 290/1 R |
| 5,808,879 A | * | 9/1998 | Liu | H02M 3/337 323/222 |

(Continued)

OTHER PUBLICATIONS

"Tutorial 2031: DC-DC Converter Tutorial," dated Nov. 29, 2001, pp. 1-14, Maxim Integrated Products, Inc., available at https://www.maximintegrated.com/en/app-notes/index.mvp/id/2031.

*Primary Examiner* — Rajnikant B Patel
(74) *Attorney, Agent, or Firm* — Brinks Gilson & Lione

(57) ABSTRACT

A system includes a DC to DC converter coupled with a load, a power source bus coupled with an input of the DC to DC converter, a capacitor coupled in parallel across an output of the DC to DC converter and a controller. The controller may dynamically adjust a bus voltage set point of a bus voltage on the output of the DC to DC converter up or down to prepare for supply of the bus voltage and energy stored in the capacitor to an anticipated load event. The load event may have a load step change that occurs in less than five milliseconds and is greater than about eighty or eighty-five percent of a rated output of the DC to DC converter.

20 Claims, 5 Drawing Sheets

(56) References Cited

U.S. PATENT DOCUMENTS

| | | | |
|---|---|---|---|
| 6,175,217 B1 * | 1/2001 | Da Ponte | H02J 9/066 |
| | | | 322/19 |
| 7,092,262 B2 | 8/2006 | Ryan et al. | |
| 8,179,703 B2 * | 5/2012 | Uno | H02M 1/4225 |
| | | | 323/284 |
| 8,314,578 B2 | 11/2012 | Namuduri et al. | |
| 8,786,264 B2 * | 7/2014 | Muhammad | H02M 3/1584 |
| | | | 323/269 |
| 8,803,499 B2 * | 8/2014 | Sreenivas | H02M 3/1588 |
| | | | 323/272 |
| 8,963,520 B1 | 2/2015 | Leone et al. | |
| 9,087,656 B1 * | 7/2015 | Vinciarelli | H01H 9/54 |
| 9,236,804 B2 | 1/2016 | Pal et al. | |
| 2005/0030772 A1 | 2/2005 | Phadke | |
| 2014/0139198 A1 * | 5/2014 | Manlove | H02M 3/156 |
| | | | 323/282 |

* cited by examiner

DC TO DC CONVERTER OUTPUT BUS VOLTAGE CONTROL SYSTEM

CROSS-REFERENCE TO RELATED APPLICATIONS

This application is a non-provisional application which claims priority under 35 USC § 119(e) to U.S. provisional application 62/547,508, "DC TO DC CONVERTER OUTPUT BUS VOLTAGE CONTROL SYSTEM" filed Aug. 18, 2017 which is incorporated herein by reference.

TECHNICAL FIELD

This disclosure relates to DC to DC converters and more specifically to DC to DC converter output bus voltage control systems.

BACKGROUND

DC to DC converters may receive a DC voltage at a magnitude and convert the received input DC voltage to a different magnitude of DC output voltage. The voltage level of the different magnitude of output voltage may be regulated by the DC to DC converter. Many DC to DC converters are switch mode converters, which use switching techniques to convert a DC input voltage to a different DC output voltage. The conversion may result in an increased DC voltage at the output or a decreased DC voltage at the output when compared to the input voltage.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a power system may include a controller that receives an indication of an anticipated load event. The anticipated load event may be a step change in load of greater than a predetermined large percentage such as about eighty or eighty-five percent that dynamically occurs over a short time period, such as about five milliseconds or less. The controller may adjust an output voltage of a DC to DC converter from a nominal voltage to a predetermined voltage value in response to receipt of the indication of the anticipated load event. A capacitor may be sized and coupled in parallel across an output of the DC to DC converter such that when the output voltage of the DC to DC converter drops in response to the step change in load, the capacitor discharges to supply the load during the step change. In addition, the capacitor may be sized to be charged from the output of the DC to DC converter when the output voltage of the DC to DC converter rises in response to the step change.

One interesting feature of the systems and methods described may be that the bus voltage for the load bus may vary from the maximum rated voltage of the load to the minimum rated voltage of the load during a transient increase step change in the load, and the bus voltage of the load bus may vary from the minimum rated voltage of the load to the maximum rated voltage of the load during a transient decrease step change in the load. The capacitor may be sized and prepared to supply energy to the load bus during the transient increase step change, and absorb energy from the load bus during the transient decrease step change.

Figure 1:
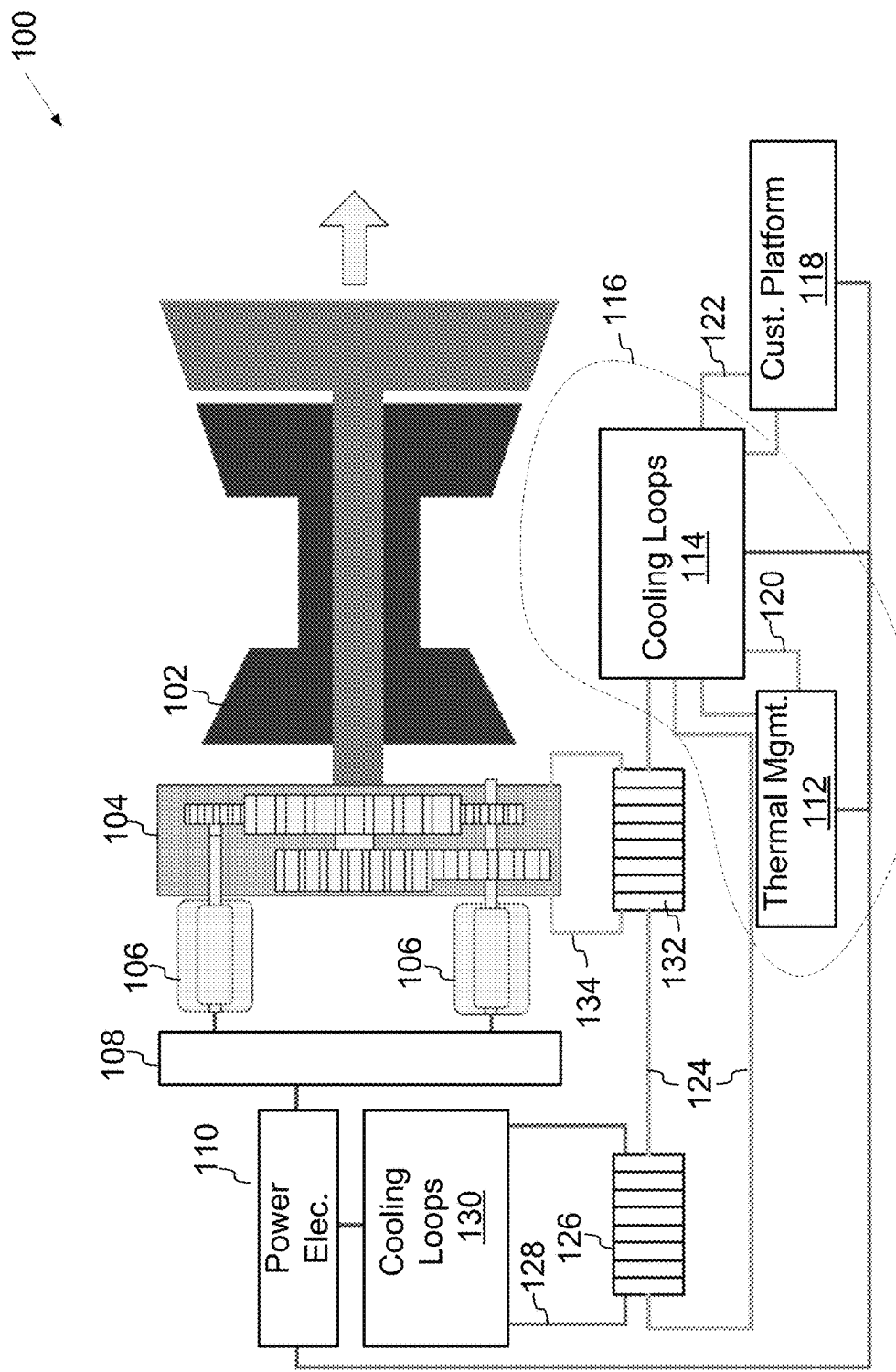
FIG. 1 illustrates a schematic of an example of an integrated power and thermal management system.

FIG. 1 illustrates a schematic of an example of an integrated power and thermal management system 100. The system 100 may include an engine 102, a gearbox 104, a generator 106 (two generators are shown in FIG. 1), an electrical bus 108 for the generator 106, power electronics 110, thermal management system components 112, and thermal management coolant loops 114.

The engine 102 may include any source of mechanical power that can drive the generator 106. Examples of the engine 102 may include a gas turbine engine, an internal combustion engine, a gas engine, a reciprocating engine, a diesel engine, a turbo fan, any other type of engine, propeller(s) of a wind turbine, and any other source of mechanical power. The engine 102 represented in FIG. 1 is a gas turbine engine.

The gearbox 104 may include any device that performs speed and/or torque conversions from a rotating power source to another device. Examples of the gearbox 104 may include gears, a gear train, a transmission, or any other type of device that performs rotational speed and/or torque conversions.

The generator 106 may include any type of electrical generator. Examples of the generator 106 may include a synchronous generator, an induction generator, an asynchronous generator, a permanent magnet synchronous generator, an AC (Alternating Current) generator, a DC (Direct Current) generator, a synchronous generator with stator coils, or any other device that converts mechanical power to electric power.

The electrical bus 108 may include any connector or connectors that conduct electricity. Examples of the electrical bus 108 may include a busbar, a busway, a bus duct, a solid tube, a hollow tube, a wire, an electrical cable, or any other electrical conductor.

The power electronics 110 may include any device or combination of devices that control and/or convert electric power. Examples of the power electronics 110 may include a power converter, a rectifier, an AC to DC converter, a switching device, a diode, a thyristor, an inverter, a transistor, and a capacitor. The power electronics 110 may include semiconductor and/or solid state devices.

The thermal management system components 112 may include any component of a thermal management system. Examples of the thermal management system components 112 may include a thermal energy storage, a vapor cycle system (VCS), a conventional air cycle system (ACS), a compressor, a valve, a gas cooler, a heat exchanger, a recuperator, an evaporator, a condenser, a battery, a coolant pump, a controller, and any other component of any type of cooling system. The thermal management system components 112 together and/or separately may have a capability to provide cooling and/or heating.

As described in more detail below, the cooling and/or heating provided by the thermal management system components 112 may be distributed by a coolant, such as ethylene glycol and water (EGW) or propylene glycol and water (PGW), through the thermal management coolant loops 114. In more general terms, the combination of the thermal management system components 112 and the thermal management coolant loops 114 form a thermal management system 116. The thermal management system 116 may provide cooling and/or heating to one or more target devices or target components.

During operation of the integrated power and thermal management system 100 (IPTMS), the IPTMS 100 may provide electrical power to a customer platform component 118. Alternatively or in addition, the IPTMS 100 may cool and/or heat the customer platform component 100. The electrical power may by generated by the generator 106 of the IPTMS 100 and the cooling and/or the heating may be provided by the thermal management system 116 of the IPTMS 100.

The customer platform component 100 may include any device or combination of devices that consumes electricity that may benefit from cooling and/or heating. Examples of the customer platform component 100 may include solid state electronics, a light-emitting diode (LED), an analog circuit, a digital circuit, a computer, a server, a server farm, a data center, a hoteling circuit such as vehicle electronics, a vehicle, an aircraft, a directed-energy weapon, a laser, a plasma weapon, a railgun, a microwave generator, a pulse-powered device, a satellite uplink, or any other electronic device that benefit from heating and/or cooling.

The integrated power and thermal management system 100 may be considered "integrated" because electrical power generated by the IPTMS 100 may power devices within the IPTMS 100, such as components of the thermal management system 116. Alternatively or in addition, the thermal management system 116 may cool and/or heat components of the IPTMS 100, such as the power electronics 110, the gear box 104, or any component of the engine 102.

As mentioned above, the cooling and/or heating provided by the thermal management system components 112 may be distributed by a coolant via the thermal management coolant loops 114. The thermal management coolant loops 114 may include independent loops in which coolant is circulated using, for example, pumps. Heat may be exchanged between two independent loops using a heat exchanger, such as a recuperator, an evaporator, or a condenser.

For example, a first loop 120 may be cooled by the thermal management system components 112. The cooled coolant in the first loop 120 may cool a coolant in a second loop 122 via a heat exchanger (not shown). In cooling the coolant in the second loop 122, the coolant in the first loop 120 may become warmer. The warmed coolant in the first loop 120 may be pumped back to the thermal management system components 112 where the coolant is again cooled. Meanwhile, the cooled coolant in the second loop 122 may be pumped to the customer platform component 118 where the coolant cools the customer platform component 118. In cooling the customer platform component 118, the coolant in the second loop 122 may become warmer. The warmed coolant in the second loop 122 may be pumped back to the heat exchanger where the coolant is again cooled by the first loop 120 via the heat exchanger.

In another example, the cooled coolant in the first loop 120 may cool a coolant in a third loop 124 via a heat exchanger (not shown) in a similar manner. The cooled coolant in the third loop 124 may cool the power electronics 110 by passing through a power electronics heat exchanger 126 that cools a coolant in a fourth loop 128. The cooled coolant in the fourth loop 128 may cool the power electronics 110 and/or cool one or more additional independent cooling loops 130 that in turn cool the power electronics 110.

Alternatively or in addition, the cooled coolant in the third loop 124 (or the warmed coolant in the third loop 124 that exits the power electronics heat exchanger 126) may pass through a gear box heat exchanger 132. The coolant in the third loop 124 that passes through the gear box heat exchanger 132 may cool oil in an oil loop 134 that flows through the gear box 104. In such a configuration, the thermal management system 116 may cool the oil in the gear box 104.

The thermal management coolant loops 114, such as the first loop 120, the second loop 122, the third loop, 124, and the fourth loop 128, that are illustrated in FIG. 1 are simply examples of the thermal management coolant loops 114. In other examples, the thermal management coolant loops 114 may include additional, fewer, or different coolant loops than shown in FIG. 1. Alternatively or in addition, the thermal management system 116 may cool additional, fewer, or different components of the IPTMS 100 than shown in FIG. 1.

With respect to generating electrical power, the engine 102 may cause a shaft of the generator 106 to rotate via the gearbox 104 during operation of the IPTMS 100. As the shaft of the generator 106 rotates, the generator 106 may generate electricity. The electrical bus 108 may transmit the generated electricity to the power electronics 110. The power electronics 110 may transform, control, and/or store the generated electricity. For example, the power electronics 110 may convert AC current generated by the generator 106 into DC current for delivery to the customer platform component 118. The power electronics 110 may deliver electricity to one or more components of the thermal management system 116 and/or to any other component of the IPTMS 100.

The IPTMS 100 may include additional, fewer, or different components than shown in FIG. 1. For example, the IPTMS 100 may include additional or fewer heat exchangers than shown in FIG. 1. As another example, the IPTMS 100 may not include the additional independent cooling loops 130 that cool the power electronics 110. In still another example, the power electronics 110 may be integrated with the generator 106 so as to eliminate the discrete electrical bus 108 shown in FIG. 1. In yet another example, the IPTMS 100 may include a single generator. In some examples, the IPTMS 100 may not include the gearbox 104. Instead, the generator 106 may be directly coupled to a mechanical output, such as a shaft, of the engine 102.

Figure 2:
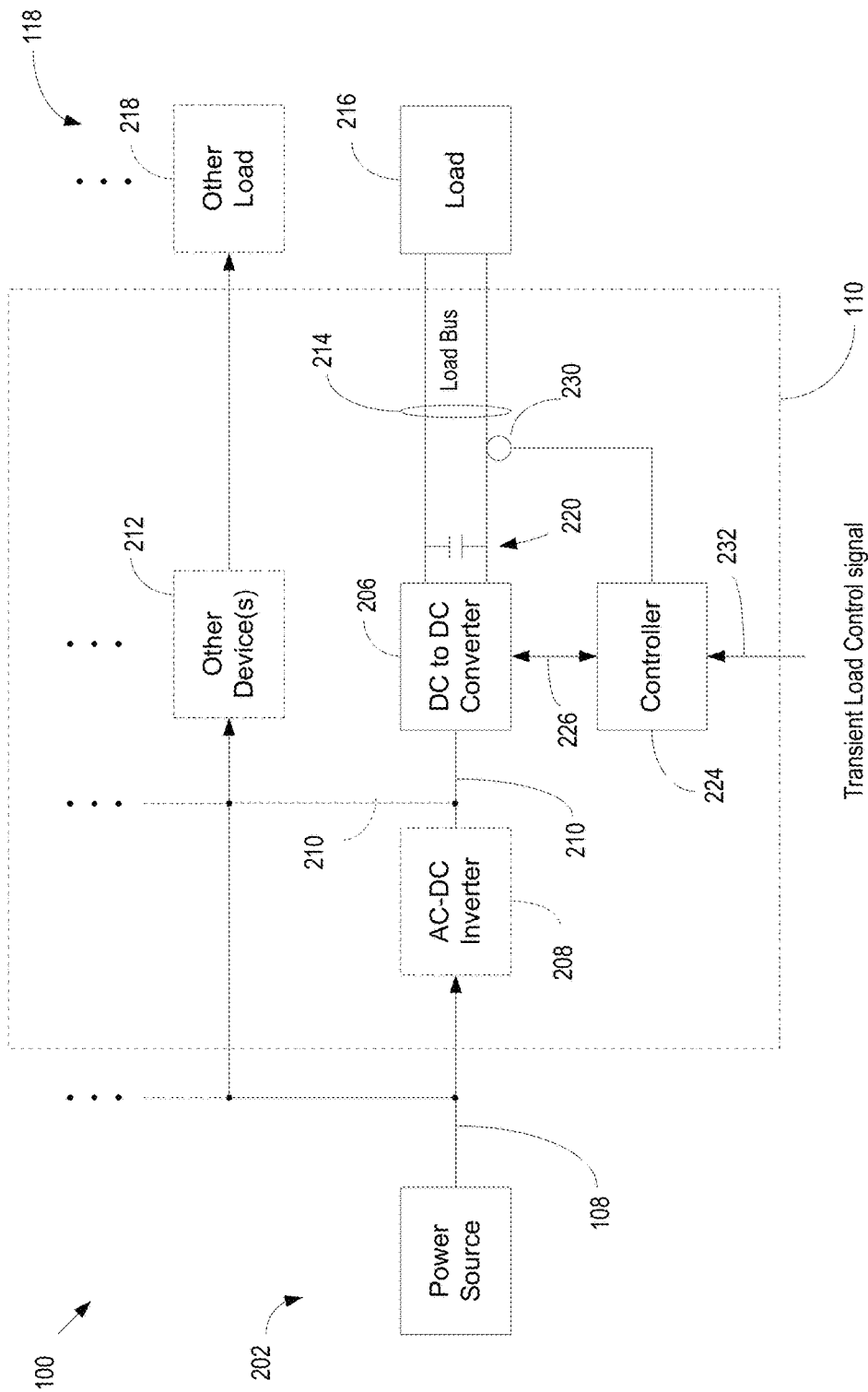
FIG. 2 is a block diagram of an example of a portion of a power system that includes power electronics included in the system.

FIG. 2 is a block diagram of an example of a portion of a power system that includes the power electronics 110 included in the IPTMS 100. In the example of FIG. 2, a power source 202 is illustrated as supplying electric power to the electrical bus 108, which supplies power to the customer platform 118. The power source 202 may represent the engine 102, gearbox 104, generator 106, thermal management system 116, and gear box heat exchanger 132, as illustrated in the example of FIG.1. In other examples, other configurations of power sources may be used to supply electric power to the electrical bus 108. The electrical bus 108 may also supply power directly to the customer platform 118 (without the power electronics 110), and/or may supply any other loads or busses. In an example configuration, the electrical bus may be a 700 VAC bus.

The power electronics 110, or power system, may include a DC to DC converter 206 which receives power such as direct current (DC) voltage and current from the electrical power source bus 108. In examples where the power source 202 provides alternating current (AC) power, the power electronics 110 may also include an inverter 208 to convert the AC power to DC power supplied on a power source bus 210. Where the power source 202 supplies DC power, the inverter 208 may be omitted and the electrical bus 108 and the power source bus 210 may receive similar voltage and current. The power electronics 110 may also include other devices 212, such as other inverters, DC to DC converters and the like, which may be supplied power from the electrical bus 108, and/or the power source bus 210.

The power source bus 210 may be coupled to an input of the DC to DC converter 206. In addition to other device(s) 212, the power source bus 210 may also be coupled to other buses and/or loads, either via the power electronics 110, or directly. In an example configuration, the power source bus 210 may be a 700 volt AC bus or DC bus. The DC to DC converter 206 may receive power from the power source bus 210, and output an output voltage on a load bus 214.

The load bus 214 may be coupled with a load 216. The load 216 may be one of a plurality of loads included in the customer platform 118. The customer platform 118 may include other loads 218, which may, or may not, be supplied power from other device(s) 212 included in the power electronics 110. In an example, the load bus 214 may be 300 VDC bus with about eighty-five percent to ninety-five percent, or about eighty percent to ninety-five percent of the load being a dynamically switched single device, and five percent to fifteen percent or five percent to twenty percent of the load being any of a number of devices representing a steady state load, where about is +/− five percent. The loads may also include impedance of power distribution devices, such as switching devices, transformers, etc., and conductors, such as cables, in the power supply path to devices, such as the dynamically switch single device, so that such line inductance is taken into account as a system variable with respect to changes in voltage and/or current within the system. The single device may represent a dynamic load demand creating a transient load ranging from about zero to five percent to about (+/− five percent) eighty-five to ninety-five percent, or from about (+/− five percent) zero to five percent to eighty to ninety-five percent of the total load of the load bus 214 with step changes in bus loading occurring over a time period of about five milliseconds or less (where about is +/−2 milliseconds), such as vehicle electronics, a vehicle, an aircraft, a directed-energy weapon, a laser, a plasma weapon, a railgun, a microwave generator, a pulse-powered device or any other device. The steady state load representing five to fifteen percent of the total load on the load bus 214 may be a substantially constant bus load.

The DC to DC converter 206 may be any type of electric or electromechanical device capable of converting a DC voltage from one voltage level to another voltage level. Conversion between voltage levels may be buck or boost, and may be performed by, for example, high frequency switching using stored energy. The DC to DC converter 206 may be, for example, a uni-directional switched mode converter.

The DC to DC converter 206 may be sized and rated to supply only 100% of the expected peak power needed by the load (total peak power supplied to transient load and steady state load) during substantially steady state conditions. Thus, the output voltage of the DC to DC converter 206 may be regulated to stay within a minimum predetermined rated voltage of the load 216 and a maximum predetermined rated voltage of the load 216. In an example operation, over about(+/− five percent) eight or eighty five percent of the load 216 may be dynamically switched on and off of the load bus 214 creating a step change in the load 216 on the load bus 214 that occurs in about five milliseconds or less. In other words, since the DC to DC converter 206 is rated to supply only about(+/− five percent) 100% of the peak load, the change in load may be over about(+/− five percent) eighty or eighty-five percent of the output power of the DC to DC converter 206. During these transient conditions, the voltage on the load bus 214 may vary even during regulation by the DC to DC converter 206. In this regard, voltage regulation with the DC to DC converter 206 may be matched to the transient load conditions. In addition, anticipatory operation of the DC to DC converter 206 may be performed in advance of load events to prepare for such load events to occur.

A capacitor 220 may be coupled in parallel across the output of the DC to DC converter 206 so as to be coupled in parallel between the DC to DC converter 206 and the load 216. The capacitor 220 may be any form of two conductors that are placed in close proximity separated by a dielectric in order to develop an electric field that stores and discharges electrical energy. The output voltage of the DC to DC converter 206 may be supplied to the capacitor 220 and the load 216 via the load bus 214. The capacitor 220 may be sized to support the bus voltage of the load bus 214 during the transient conditions by cooperatively operating with the DC to DC converter 206. In this regard, the capacitor 220 may absorb additional energy to maintain the bus voltage on the load bus 214 below a predetermined maximum voltage when a load event is a load decrease of greater than about (+/− five percent) eighty or eighty-five percent in less than about five milliseconds. In addition, the capacitor 220 may discharge to supply energy to maintain the bus voltage of the load bus 214 above a predetermined minimum voltage when the load event is a load increase of greater than about (+/− five percent) eighty or eighty-five percent in less than about five milliseconds. In addition, the capacitors may provide filtering of ripple current.

The output voltage of the DC to DC converter 206, and hence the bus voltage of the load bus 214 may be regulated. Regulation of the bus voltage of the load bus 214 may be performed by a controller 224. The DC to DC converter 206 may supply an output voltage to the load bus 214 as directed by the controller 224. For example, the controller 224 may dynamically provide a selectively varied set point representing a desired voltage of the load bus 214 to the DC to DC converter 206. Alternatively, or in addition, the controller 224 may directly and dynamically control the DC to DC converter 206 to substantially maintain a desired voltage on the load bus 214, such as +/−3% of a desired set point voltage. The controller 224 and the DC to DC converter 206 may cooperatively operate as a voltage control device (VCD).

The DC to DC converter 206 may be in communication with a controller 224 over a communication bus 226. The controller 216 may include a processor and/or other device capable of performing logic, and a memory. The processor and/or memory may be included in the DC to DC converter 206, or any other device, or may be a standalone device. Any of the functionality described herein may be performed or directed by or as a result of the controller 216. The memory may be a storage medium that is other than transitory, and stores instructions executable by the processor and/or other device, and data.

The controller 224 may operate with the DC to DC converter 206 as a voltage control device (VCD) to monitor and control the magnitude of voltage on load bus 214 using a sensor 230. The sensor may be a voltage sensor 230, such as a potential transformer, or other form of transducer providing an output signal to the controller 224 indicative of the actual sensed voltage on the load bus 214. The controller 224 may also receive other operational parameters, such as a sensed voltage on the power source bus 210, operational health of the DC to DC converter 206, such as temperature or percent loaded, current flow on the load bus 214, charged potential of the capacitor 220 and other parameters that may be used in controlling the voltage on the load bus 214.

The controller 224 may also receive a transient load control signal on a control signal line 232. The transient load control signal may be an advisory signal, or anticipatory signal, or a feed forward signal that is indicative of a load event prior to a step change in the transient load. In an example, the transient load control signal may be provided a predetermined time period ahead of the load event, or may provide a time when the load event will occur as part of the signal. In addition, the transient load control signal may provide a magnitude of the load, and/or a duration of how long the load event will continue. The control signal may be provided by an external trigger such as another controller, a signal provided from the transient load, operation of a contact closure, or any other source capable of providing an indication of an anticipate load event prior to the load event actually occurring. The load event, such as a step change by the transient load, may occur after the controller 224 has received and reacted to the transient load control signal. Thus, the controller 224 may monitor for a control signal indicative of an imminent step change in the transient load, the imminent step change being greater than about an eighty or eighty-five percent change in the load on the load bus 214, and occurring in a period of time of about five milliseconds or less.

In response to receipt of the control signal indicative of an anticipated load event, the controller 224 may dynamically adjust the output voltage of the DC to DC converter 206 to achieve a desired predetermined bus voltage on the load bus 214 before the load event occurs. Thus, the controller 224 may dynamically adjust a bus voltage set point of the bus voltage on the output of the converter up or down to prepare for supply of the bus voltage and energy stored in the capacitor 220 to an anticipated load event having a load step change of greater than about eighty or eighty-five percent of a rated output of the DC to DC converter 206 that occurs in less than about five milliseconds. The controller 224 may regulate the output voltage on the load bus 214 to a predetermined minimum voltage or to predetermined maximum voltage or to a predetermined nominal voltage of the load in dependence upon the control signal indicative of the step change. Thus, the controller 224 is provided with a control signal indicative of the load event prior to a change in the load on the load bus 214, and initiates adjustment of the bus voltage on the output of the DC to DC converter 206 prior to the change in the load to prepare the bus voltage and the capacitor for the step change in load.

The predetermined minimum voltage and the predetermined maximum voltage may be established base on the minimum and maximum rated operating voltages of the load. Thus, for example, if the load is rated for operation at a nominal voltage of 300VDC, a maximum voltage of 340VDC and a minimum voltage of 260VDC, the controller 224 may adjust the bus voltage of load bus 214 accordingly. In other examples, other minimum, maximum and nominal voltages are possible. In addition, in particular situations where the load does not represent the constraint of the maximum and minimum voltage on the load bus 214, the maximum and minimum voltage may be predetermined based on the constraining parameter or operational condition.

When the control signal indicates to the controller 224 that an anticipated step change increase in the transient load is imminent (e.g. the transient load is about to be energized or turned on), the controller 224 may direct the DC to DC controller 224 to increase the bus voltage to the predetermined maximum voltage in preparation for the load event. When the control signal indicates to the controller 224 that an anticipated step change decrease in the transient load is imminent (e.g. the transient load is about to be de energized or turned off), the controller 224 may direct the DC to DC controller 224 to decrease the bus voltage to the predetermined minimum voltage in preparation for the load event.

The DC to DC converter 206 may be designed to support the step changes in the transient load, however, the bus voltage of the load bus 214 may significantly increase or decrease due to the transient condition when the step change occurs. Even with the controller 224 increasing and decreasing the desired bus voltage of the load bus 214 in anticipation of (or preparation for) the step change, during the transient step change load condition, the bus voltage may still exceed the predetermined maximum voltage or the predetermined minimum voltage if it were not for careful selection of the size of the capacitor 220.

The DC to DC converter 206 and the capacitor 220 may also cooperatively operate during a transient event caused by a fault condition to maintain the bus voltage on the load bus 214. For example, where the occurrence of a fault causes a transient step change in the bus voltage, the capacitor 220 may discharge energy to the load bus 214 until such time as the DC to DC converter 206 can react to the fault condition. Accordingly, during the transient caused by the fault the bus voltage may go between the minimum rated voltage of the load and the maximum rated voltage of load, but may be maintained within these limits during the fault condition.

Figure 3:
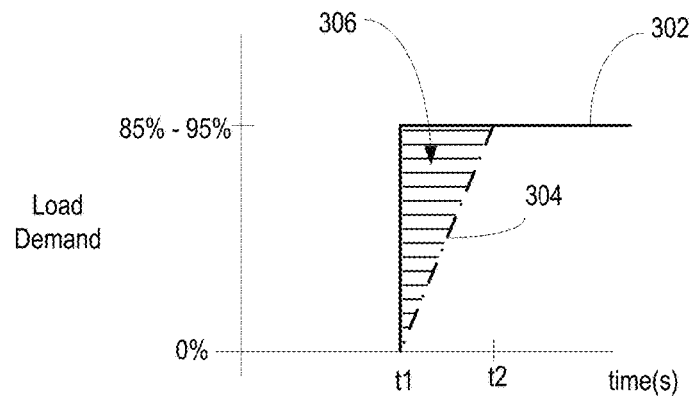
FIG. 3 is an example of a transient load step change increase in a transient load.

FIG. 3 is an example of a transient load step change increase in the transient load. In FIG. 3, the transient load 302 is illustrated as changing at t1, in about five milliseconds or less, from about zero to between about eighty and eighty five percent and ninety-five percent of the total load on the load bus or the rated output of the DC to DC converter 206. The DC to DC converter output power 304 may react to the step change in the transient load by ramping the power output higher to support the added load. The ramp time of the DC to DC converter may result in a shortfall in available power to supply the load during the transient stage. The shortfall is illustrated as 306 in FIG. 3. The capacitor 220 may be sized and prepared for the step change in load by adjusting the bus voltage to provide stored energy (E) that will be available for the shortfall based on:

$$E = \frac{1}{2}CV^2 \qquad \text{Equation 1}$$

where C is the capacitance (farads) and V is the voltage of the load bus 214. In addition, the current (I) capability of the capacitor 220 to adequately charge and discharge to keep the bus voltage between the rated maximum and minimum during the transient step change as the transient load is energized and deenergized may be based on:

$$I = C\frac{dv}{dt} \qquad \text{Equation 2}$$

where $$\frac{dv}{dt}$$

is the instantaneous rate of voltage change in volts per second.

In an example installation, referring to FIGS. 2 and 3, it may be important that weight and size of the DC to DC converter 206 and the capacitor 220 are maintained as small as possible. Thus, the rating of the DC to DC converter 206 may be matched to the discharge and charge capacity of the capacitor 220 so as to allow the bus voltage of the load bus 214 to fluctuate to the high and low voltage limits of the load during operation. This approach allows the DC to DC converter 206 and the capacitor 220 to cooperatively operate to allow the bus voltage of the load bus 214 to reach but not extend out of a range of voltage between the minimum and maximum rated voltages of the load. Thus, the DC to DC converter 206, when directed by the controller 224, may ramp the bus voltage in response to an anticipated transient change in the load 216, and the capacitor 220 may be sized to supply power to the load 216 during the transient change, or store power received from the output during the transient change to support the bus voltage so as to maintain the bus voltage in a range between the rated minimum and maximum voltage of the load 216.

Since the voltage on the load bus 214 is DC, the capacitor 220 will charge to the bus voltage. Thus, as the controller 224 ramps the DC to DC converter 206 to the maximum or minimum voltage in anticipation of an upcoming load event, the capacitor 220 may similarly ramp corresponding higher or lower in stored charge. This dynamic change in the bus voltage effectively prepares the load bus 214 and the capacitor 220 for the upcoming load event. At the time the transient load is either placed on the load bus 214 or removed from the load bus 214, the transient change in voltage triggers the capacitor 220 to either charge or discharge energy to maintain the bus voltage within the upper and lower voltage limits during the transient step change in load.

For example, the capacitor 220 coupled in parallel across an output of the DC to DC converter 206 may discharge power to the load bus 214 when the output voltage of the DC to DC converter 206 drops in response to the step change in load (which dynamically occurs over a time period of about five milliseconds or less) being a step change increase in load of about eighty or eighty-five to ninety-five percent of the entire load on the load bus 214. The controller 224 may control the output voltage of the DC to DC converter 206 to a set point equal to a minimum predetermined rated voltage of the load while the capacitor is discharging to the load bus 214. The capacitor 220 may discharging power to the load bus 214 only during a transient of the step change increase in the load. In other examples, instead of a drop in output voltage, output current of the DC to DC converter 206 could be monitored with a current sensor to trigger discharge of power to the load bus 214 by the capacitor 220.

In another example, the capacitor 220 may be charged by receiving energy from the load bus 214 when the output voltage of the DC to DC converter 206 rises in response to the step change in load being a step change decrease in load of about eighty or eighty-five to ninety-five percent of the entire load on the load bus 214, which dynamically occurs over a time period of about five milliseconds of less. The controller 224 may control the output voltage of the DC to DC converter 206 to a set point equal to a minimum predetermined rated voltage of the load 216 while the capacitor 220 is charging by receiving power from the load bus 214. In this example, the capacitor may only be charged by the load bus 214 during a transient of the step change decrease in the load, while at the about the same time the set point of the bus voltage is reduced.

The controller 224 and DC to DC converter 206, operating as a Voltage Control Device (VCD), may be set to regulate a bus voltage to a load. The VCD voltage may be normally set to a mid-point of the allowed voltage range, and the VCD and/or bus capacitance may attempt to hold the voltage to that mid-point. The equivalent capacitance on the bus may be sized to handle the energy needed to compensate for the inductance in the system, and the time delay in the VCD control, and to keep the bus voltage in range. For a system with a very fast transient load change, the transient may need to be handled solely by the capacitor. By providing the controller 224 with a load change anticipation signal in the form of the transient load control signal. Since the state of change of the load is transmitted to the controller 224 prior to the actual transient change in load, by, for example, a few hundred milliseconds, then the VCD output voltage (the bus voltage on the load bus 214) may be manipulated to anticipate the fast transient change, thereby reducing the total amount of equivalent capacitance needed on the load bus 214.

Figure 4:
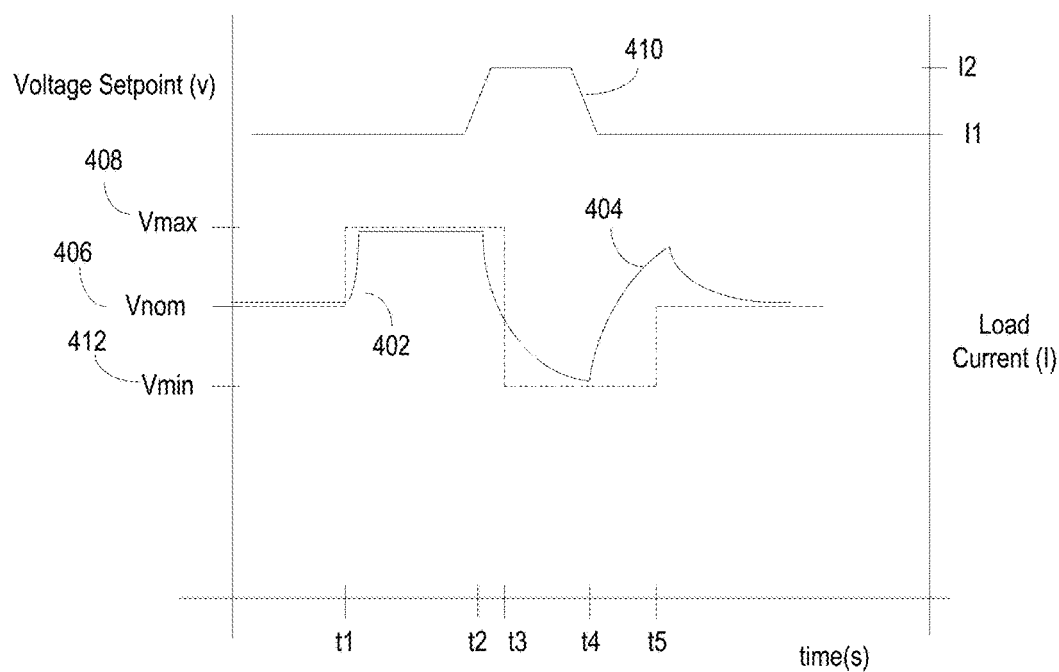
FIG. 4 is an example illustration of operational control of the voltage on a load bus and corresponding voltage control by a controller.

FIG. 4 is an example illustration of operation of the voltage on the load bus and corresponding voltage control by the controller. With reference to FIGS. 2 and 4, a desired voltage set point 402 of the controller 224 for the DC to DC converter 206 is illustrated as being varied over time period (t). In addition, variation in an actual voltage 404 of the load bus 214 is illustrated over the same time period (t). Prior to time t1, the desired voltage setpont 402 may be at a nominal voltage (Vnom) 406, such as 300 VDC. At time t1, the controller 224 may receive the transient load control signal on the control signal line 232 indicating that a step change increase in the load is imminent, and the controller 224 may adjust the voltage set point 402 to a maximum voltage set point 408 that corresponds to a maximum rated voltage of the load. In response to the change in the voltage set point 402, the DC to DC converter 206 may correspondingly increase the voltage 404 on the load bus 214 to the maximum rated voltage of the load (Vmax) 408, such as 340VDC. At time t2, the transient load may be energized with the load bus 214 causing a dip in the bus voltage 404 and a corresponding increase in load current (I) 410 supplying the transient load from load current I1 to load current I2, such as from 0 amps to 1200 amps.

Shortly thereafter, such as at time t3, the controller 224 may adjust the desired voltage set point 402 to a minimum rated voltage (Vmin) 412 corresponding to a minimum rated voltage of the load, such as 260VDC and the bus voltage 404 may decrease toward the minimum rated voltage of the load. Some time thereafter, such as at time t4, the transient load may be removed from the load bus 214 causing an increase in the bus voltage 404 and corresponding decrease in the load current (I) 410 supplying the transient load from I2 to I1. Some time thereafter the controller 224 may adjust the desired voltage set point 402 to the nominal voltage set point (Vnom) 406, such as 300VDC. During these times of transient loading and unloading of the voltage bus 214, the DC to DC converter 206 may cooperatively operate with the capacitor 220 to maintain the bus voltage 404 between the maximum and minimum rated voltage of the load.

Figure 5:
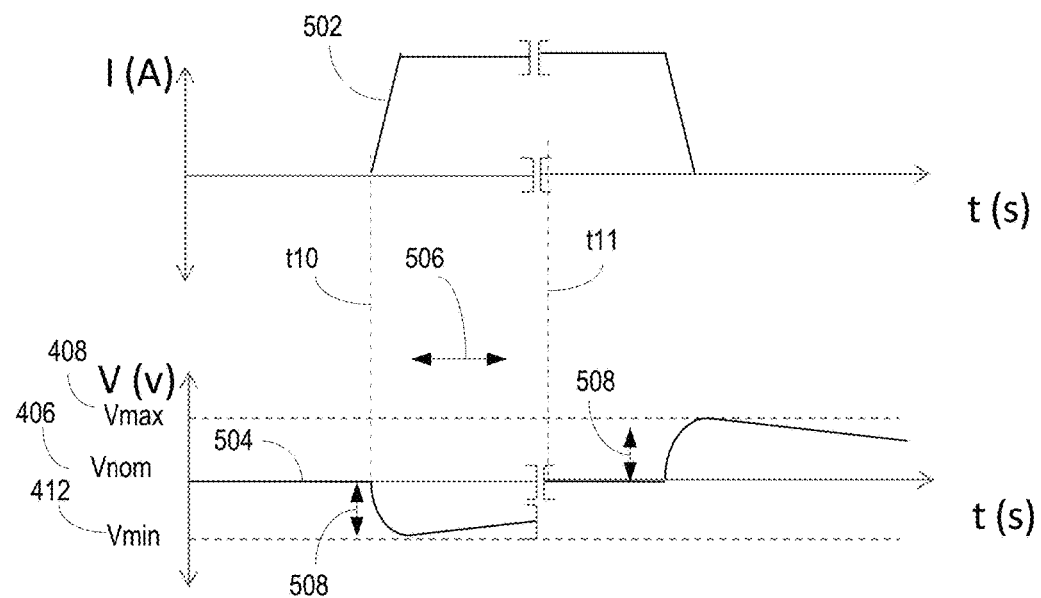
FIG. 5 illustrates a bus current and a bus voltage of the load bus during example load events without adjusting the bus voltage prior to the load events.

FIG. 5 illustrates bus current 502 and bus voltage 504 of the load bus during example load events without adjusting the bus voltage prior to the load events. In the example of FIG. 5, the voltage set point of the DC to DC converter is set to the nominal voltage set point (Vnom) 406 at a time t10 of the load event. The transient load changes in less than about five milliseconds, but the response time of the voltage control device is longer, such as for example, about five to ten milliseconds, in returning the bus voltage 504 of the load bus to the nominal voltage set point (Vnom) 406. For example, FIG. 5 illustrates a response time period 506 of a positive step change load event between time t10 and time t11. In this example, the capacitance of the capacitor is sized such that a total excursion 508 of the bus voltage 504 on the load bus goes between the nominal voltage set point (Vnom) 406 and the minimum voltage set point (Vmin) 412 on a positive step change load event in the transient load, and between the nominal voltage set point (Vnom) 406 and the maximum voltage set point (Vmax) 408 on a negative step change load event in the transient load.

Figure 6:
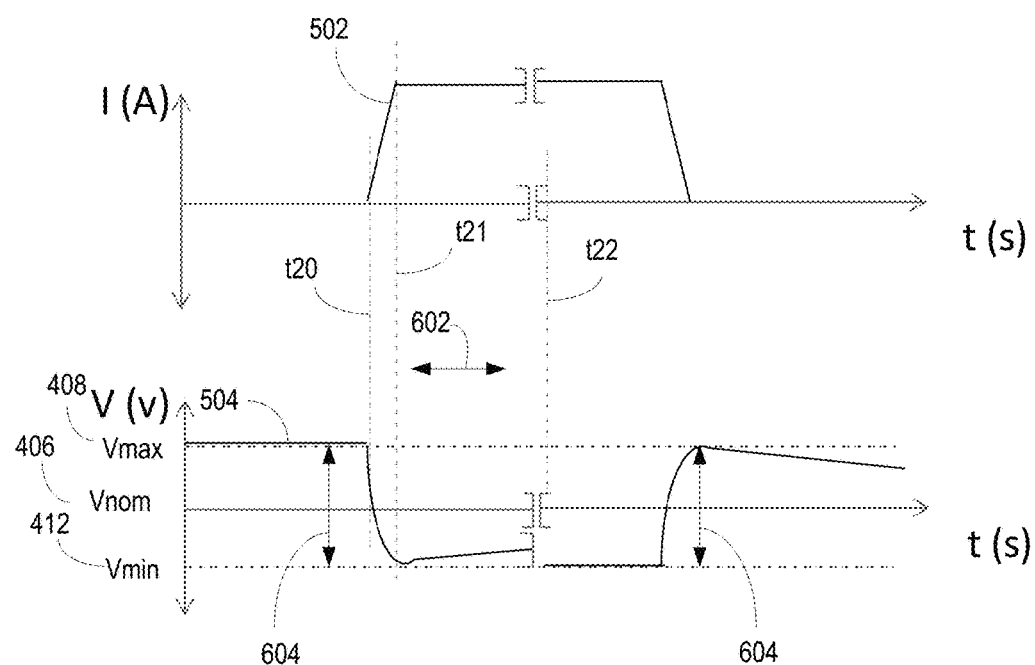
FIG. 6 illustrates a bus current and a bus voltage during the same example load events as illustrated in FIG. 5 with the bus voltage 504 adjusted prior to the load events.

FIG. 6 illustrates the bus current 502 and the bus voltage 504 during the same example load events as illustrated in FIG. 5 with the bus voltage 504 adjusted prior to the load events. In FIG. 6, the controller is provided the transient load control signal in advance of the load event as an indication of an anticipated load event. In this example, the transient load control signal indicates that the step change in the transient load is imminent and will be a dynamically occurring positive load step change (e.g. the load will be energized by the load bus). In response, the controller adjusts the voltage set point of the DC to DC converter to the maximum voltage set point (Vmax) 408. At a time t20, while the bus voltage 504 is at the maximum voltage set point (Vmax) 408, the transient load step change occurs in less than about five milliseconds. Not long after the step change in the load, at time t21, the controller may adjust the voltage set point of the DC to DC converter to the minimum voltage set point (Vmin) 412. The load changes in less than about 5 milliseconds, however the response time of the voltage control device is longer, such as for example, about five to ten milliseconds.

Since the voltage set point was changed after the anticipated load event, the difference between the actual bus voltage 504 and the voltage set point is reduced, which reduces a response time period 602 between time t20 and time t22, when compared to the example of FIG. 5. In addition, in the example of FIG. 6, the capacitance may be sized such that a total excursion 604 of the bus voltage 504 on the load bus goes between the maximum voltage set point (Vmax) 408 and the minimum voltage set point (Vmin) 412 in response to a positive step change in the transient load, and between the minimum voltage set point (Vmin) 412 and the maximum voltage set point (Vmax) 408 in response to a negative step change in the transient load. In the example of FIG. 6, the total excursions 604 of the load voltage 504 are substantially equal and opposite. Since the voltage change on the capacitor is inversely proportional to the value of capacitance, the larger excursion of the bus voltage 504 requires less capacitance than the previous example of FIG. 5.

Figure 7:
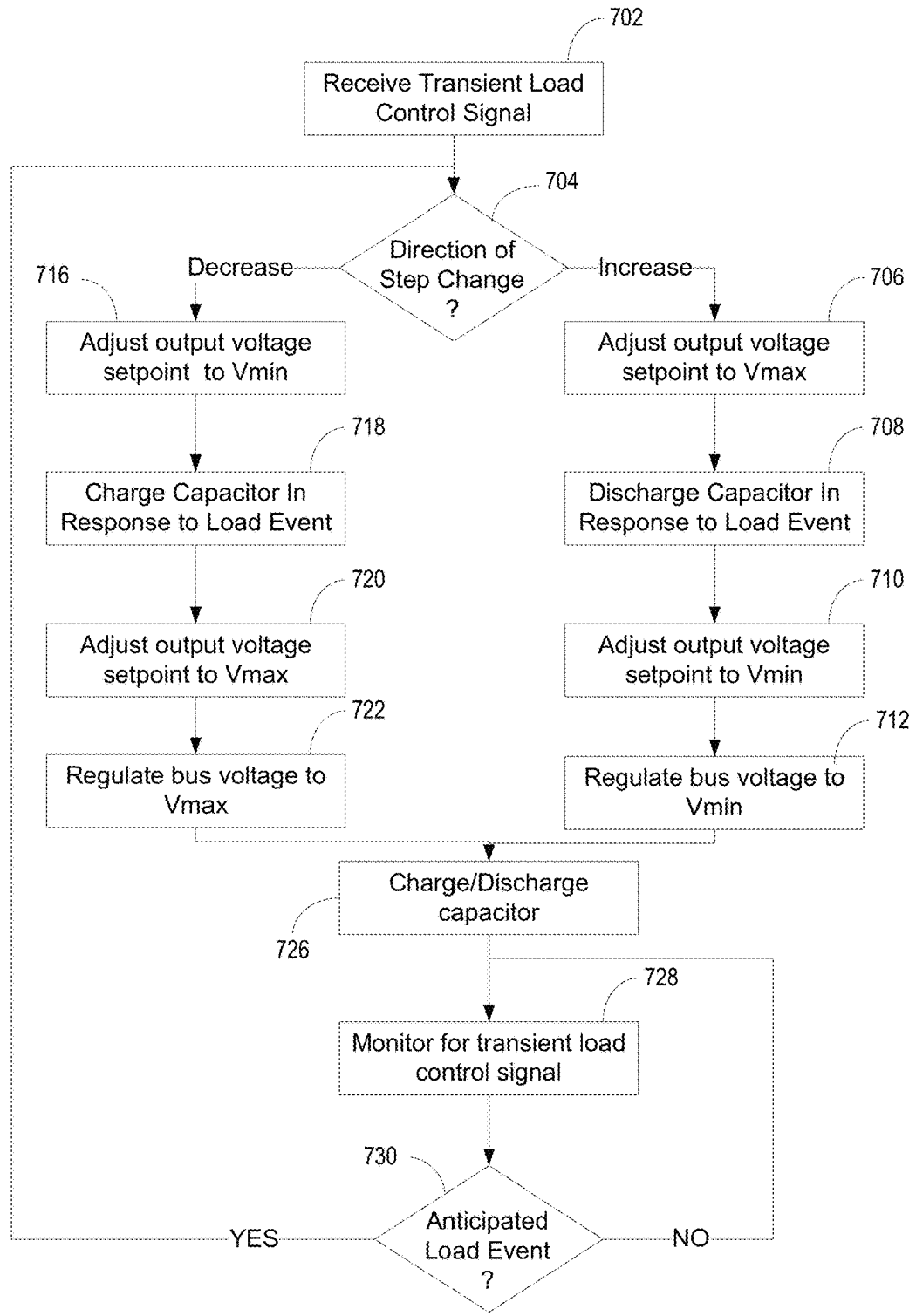
FIG. 7 is an operational flow diagram of an example of the system.

FIG. 7 is an operational flow diagram of an example of the system. The operation starts with receipt by the controller of an indication of an anticipated load event in the form of the transient load control signal. (702) It is determined from the transient load control signal the direction of the imminent step change. (704) If the step change of the transient load is an increase in load on the load bus, the controller adjusts the output voltage provided on the load bus to the maximum rated voltage of the load (Vmax) before the anticipated load event occurs to prepare the load bus and the capacitor for the step change load event. (706) The load event occurs, and the capacitor is discharged onto the load bus to supplement the energy supplied to the dynamically increasing load during the transient conditions. (708) Following the load event, the output voltage set point provided on the load bus is adjust to the minimum rated voltage of the load (Vmin). (710) The bus voltage of the load bus may then be regulated to the minimum rated voltage of the load (Vmin). (712)

If the step change of the transient load is a decrease in load on the load bus, the controller adjusts the output voltage provided on the load bus to the minimum rated voltage of the load (Vmin) before the anticipated load event occurs to prepare the load bus and the capacitor for the load event. (716) The load event occurs, and the capacitor is charged from the load bus to absorb energy that is suddenly available on the load bus due to the transient load being dynamically removed from the bus. (718) Following the load event, the output voltage set point provided on the load bus is adjust to the maximum rated voltage of the load (Vmax). (720) The bus voltage of the load bus may then be regulated to the maximum rated voltage of the load (Vmax). (722)

The capacitor may charge or discharge as appropriate in accordance with the bus voltage such that the energy stored in the capacitor is equal to the (bus voltage)$^2$. (726) The controller may monitor for another transient load control signal. (728) Upon receipt of another control signal, the controller may determine if the transient load control signal indicates another anticipated load event is imminent. (730) If not, the controller continues monitoring for transient load signals (728), and if the control signal indicates a step change load event is imminent, the controller determines the direction of the step change (704).

Each component described herein may include additional, different, or fewer components. For example, the controller 224 may be multiple controllers, the capacitor 220 may be multiple capacitors, or the sensor 230 may be multiple sensors. In addition, the power system 110 may be implemented with additional, different, or fewer components. For example, the AC-DC inverter 208 and other devices 212 may be omitted or included. The logic described and illustrated in the flow diagrams may include additional, different, or fewer operations than described and/or illustrated to obtain similar functionality. In addition, the operations of the system described and illustrated herein, may be performed in a different order.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. In addition, the use of the article "a" in the claims is equivalent to "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
    a DC to DC converter coupled with a load;
    a power source bus coupled with an input of the DC to DC converter;
    a capacitor coupled in parallel across an output of the DC to DC converter; and
    a controller configured to dynamically adjust a bus voltage set point of a bus voltage on the output of the converter up or down to prepare for supply of the bus voltage and energy stored in the capacitor to an anticipated load event having a load step change that occurs in less than about 5 milliseconds and is greater than about 85% of a rated output of the DC to DC converter.

2. The system of aspect 1, wherein the capacitor is prepared by adjustment of the bus voltage so that the capacitor absorbs additional energy to maintain the bus voltage below a predetermined maximum voltage in response to the load event being a load decrease of greater than about 85% of the rated output of the DC to DC converter that occurs in less than about 5 milliseconds, and wherein the capacitor is prepared by adjustment of the bus voltage so that the capacitor supplies energy to maintain the bus voltage above a predetermined minimum voltage in response to the load event being a load increase of greater than about 85% of the rated output of the DC to DC converter that occurs in less than about 5 milliseconds.

3. The system as in aspect 1 or 2, wherein the controller is provided with a control signal indicative of the load event prior to a change in the load, and initiates adjustment of the bus voltage on the output of the DC to DC converter prior to the change in the load.

4. The system as in any of aspects 1-3, wherein the controller is configured to adjust the bus voltage set point to prepare for supply of the bus voltage and energy stored in the capacitor so that the energy stored in the capacitor supports the bus voltage during a transient period of the load step change, and the DC to DC converter supports the bus voltage after the transient period.

5. The system as in any of aspects 1-4, wherein the controller is configured to adjust the bus voltage to a predetermined rated maximum voltage of the load or a predetermined rated minimum voltage of the load.

6. The system as in any of aspects 1-5, wherein the controller is configured to increase the bus voltage a predetermined amount above a nominal bus voltage in response to the indication of the anticipated load event being an increase in the load, and the controller is configured to decrease the bus voltage a predetermined amount below the nominal bus voltage in response to the indication of the anticipated load event being a decrease in load.

7. The system as in any of aspects 1-6, wherein the DC to DC converter is configured to ramp the bus voltage in response to a transient change in the load, and the capacitor is sized to supply power to the load during the transient change or store power received from the output during the transient change to support the bus voltage between a rated minimum voltage and a rate maximum voltage of the load.

8. A method of bus voltage control comprising:
receiving at a controller an indication of an anticipated load event, the anticipated load event being a step change in load of greater than about 85% that dynamically occurs over a time period of about 5 milliseconds or less;
adjusting, by the controller, an output voltage of a DC to DC converter from a nominal voltage to a predetermined voltage value in response to receipt of the indication of the anticipated load event;
discharging a capacitor coupled in parallel across an output of the DC to DC converter when the output voltage of the DC to DC converter drops in response to the step change in load being a step change increase in load of greater than about 85% that dynamically occurs over a time period of about 5 milliseconds of less; and
charging the capacitor coupled in parallel across the output of the DC to DC converter when the output voltage of the DC to DC converter rises in response to the step change in load being a step change decrease in load of greater than about 85% that dynamically occurs over a time period of about 5 milliseconds of less.

9. The method of aspect 8, further comprising dynamically controlling the output voltage of the DC to DC converter to a set point equal to a minimum predetermined rated voltage of the load while the capacitor is discharging.

10. The method of aspect 9, further comprising dynamically controlling the output voltage of the DC to DC converter to a set point equal to a maximum predetermined rated voltage of the load while the capacitor is charging.

11. The method as in any of aspects 8-10, wherein the step of discharging the capacitor comprises discharging the capacitor during a transient of the step change increase in the load.

12. The method of aspect 11, wherein the step of adjusting, by the controller, an output voltage of a DC to DC converter from a nominal voltage to a predetermined voltage value comprises increasing the output voltage to a maximum rated voltage of the load, and the step of discharging the capacitor comprises discharging the capacitor during the transient as the output voltage goes from the maximum rated voltage of the load to a minimum rated voltage of the load to support the output voltage at or above the minimum rated voltage of the load.

13. The method as in any of aspects 8-12, wherein the step of charging the capacitor comprises charging the capacitor during a transient of the step change decrease in the load.

14. The method of aspect 13, wherein the step of adjusting, by the controller, an output voltage of a DC to DC converter from a nominal voltage to a predetermined voltage value comprises decreasing the output voltage to a minimum rated voltage of the load, and the step of charging the capacitor comprises charging the capacitor during the transient as the output voltage goes from the minimum rated voltage of the load to a maximum rated voltage of the load to maintain the output voltage at or below the maximum rated voltage of the load.

15. The method as in any of aspects 8-14, wherein the predetermined voltage value is a maximum rated voltage of the load, and the step of discharging the capacitor coupled in parallel across an output of the DC to DC converter comprises the controller dynamically reducing a set point of the DC to DC converter to adjust the output voltage from the maximum rated voltage of the load to a minimum rated voltage of the load.

16. The method of claim 15, wherein the predetermined voltage value is a minimum rated voltage of the load, and the step of charging the capacitor coupled in parallel across an output of the DC to DC converter comprises the controller dynamically increasing the set point of the DC to DC converter to adjust the output voltage from the minimum rated voltage of the load to a maximum rated voltage of the load.

17. A system comprising:
a DC to DC converter being supplied by a power source, the DC to DC converter comprising an output configured for supply of an output voltage to a load;
a controller configured to monitor for a signal indicative of an imminent step change in the load, the imminent step change being greater than about an 85% change in load, and occurring in a period of time of about 5 milliseconds or less;
a capacitor coupled in parallel at the output of the DC to DC converter;
the controller configured to regulate the output voltage to one of a predetermined minimum rated voltage of the load, or to a predetermined maximum rated voltage of the load, or to a predetermined nominal rated voltage of the load, the output voltage regulated in dependence upon the signal indicative of the step change and the capacitor sized to supply power to the load during transition from the predetermined maximum voltage to the predetermined minimum voltage, or absorb power from the load during transition from the predetermined minimum voltage to the predetermined maximum voltage.

18. The system of aspect 17, wherein the controller is configured to regulate the output voltage to the predetermined minimum rated voltage before the step change in the load occurs to prepare the capacitor to dynamically absorb power from the load during the transition of the output voltage, as a result of the step change, from the predetermined minimum voltage to the predetermined maximum voltage.

19. The system of aspect 18, wherein the controller is configured to regulate the output voltage to the predetermined maximum rated voltage to prepare the capacitor to dynamically discharge power to the load during transition of the output voltage, as a result of the step change, from the predetermined maximum voltage to the predetermined minimum voltage.

20. The system as in any of aspects 17-19, wherein an output power of the DC to DC converter is equal to a peak power of the load.

What is claimed is:

1. A system comprising:
a DC to DC converter coupled with a load;
a power source bus coupled with an input of the DC to DC converter;
a capacitor coupled in parallel across an output of the DC to DC converter; and
a controller configured to dynamically adjust a bus voltage set point of a bus voltage on the output of the converter up or down to prepare for supply of the bus voltage and energy stored in the capacitor to an anticipated load event having a load step change that occurs in less than about 5 milliseconds and is greater than about 85% of a rated output of the DC to DC converter.

2. The system of claim 1, wherein the capacitor is prepared by adjustment of the bus voltage so that the capacitor absorbs additional energy to maintain the bus voltage below a predetermined maximum voltage in response to the load event being a load decrease of greater than about 85% of the rated output of the DC to DC converter that occurs in less than about 5 milliseconds, and wherein the capacitor is prepared by adjustment of the bus voltage so that the capacitor supplies energy to maintain the bus voltage above a predetermined minimum voltage in response to the load event being a load increase of greater than about 85% of the rated output of the DC to DC converter that occurs in less than about 5 milliseconds.

3. The system of claim 1, wherein the controller is provided with a control signal indicative of the load event prior to a change in the load, and initiates adjustment of the bus voltage on the output of the DC to DC converter prior to the change in the load.

4. The system of claim 1, wherein the controller is configured to adjust the bus voltage set point to prepare for supply of the bus voltage and energy stored in the capacitor so that the energy stored in the capacitor supports the bus voltage during a transient period of the load step change, and the DC to DC converter supports the bus voltage after the transient period.

5. The system of claim 1, wherein the controller is configured to adjust the bus voltage to a predetermined rated maximum voltage of the load or a predetermined rated minimum voltage of the load.

6. The system of claim 1, wherein the controller is configured to increase the bus voltage a predetermined amount above a nominal bus voltage in response to the indication of the anticipated load event being an increase in the load, and the controller is configured to decrease the bus voltage a predetermined amount below the nominal bus voltage in response to the indication of the anticipated load event being a decrease in load.

7. The system of claim 1, wherein the DC to DC converter is configured to ramp the bus voltage in response to a transient change in the load, and the capacitor is sized to supply power to the load during the transient change or store power received from the output during the transient change to support the bus voltage between a rated minimum voltage and a rate maximum voltage of the load.

8. A method of bus voltage control comprising:
receiving at a controller an indication of an anticipated load event, the anticipated load event being a step change in load of greater than about 85% that dynamically occurs over a time period of about 5 milliseconds or less;
adjusting, by the controller, an output voltage of a DC to DC converter from a nominal voltage to a predetermined voltage value in response to receipt of the indication of the anticipated load event;
discharging a capacitor coupled in parallel across an output of the DC to DC converter when the output voltage of the DC to DC converter drops in response to the step change in load being a step change increase in load of greater than about 85% that dynamically occurs over a time period of about 5 milliseconds of less; and
charging the capacitor coupled in parallel across the output of the DC to DC converter when the output voltage of the DC to DC converter rises in response to the step change in load being a step change decrease in load of greater than about 85% that dynamically occurs over a time period of about 5 milliseconds of less.

9. The method of claim 8, further comprising dynamically controlling the output voltage of the DC to DC converter to a set point equal to a minimum predetermined rated voltage of the load while the capacitor is discharging.

10. The method of claim 9, further comprising dynamically controlling the output voltage of the DC to DC converter to a set point equal to a maximum predetermined rated voltage of the load while the capacitor is charging.

11. The method of claim 8, wherein the step of discharging the capacitor comprises discharging the capacitor during a transient of the step change increase in the load.

12. The method of claim 11, wherein the step of adjusting, by the controller, an output voltage of a DC to DC converter from a nominal voltage to a predetermined voltage value comprises increasing the output voltage to a maximum rated voltage of the load, and the step of discharging the capacitor comprises discharging the capacitor during the transient as the output voltage goes from the maximum rated voltage of the load to a minimum rated voltage of the load to support the output voltage at or above the minimum rated voltage of the load.

13. The method of claim 8, wherein the step of charging the capacitor comprises charging the capacitor during a transient of the step change decrease in the load.

14. The method of claim 13, wherein the step of adjusting, by the controller, an output voltage of a DC to DC converter from a nominal voltage to a predetermined voltage value comprises decreasing the output voltage to a minimum rated voltage of the load, and the step of charging the capacitor comprises charging the capacitor during the transient as the output voltage goes from the minimum rated voltage of the load to a maximum rated voltage of the load to maintain the output voltage at or below the maximum rated voltage of the load.

15. The method of claim 8, wherein the predetermined voltage value is a maximum rated voltage of the load, and the step of discharging the capacitor coupled in parallel across an output of the DC to DC converter comprises the controller dynamically reducing a set point of the DC to DC converter to adjust the output voltage from the maximum rated voltage of the load to a minimum rated voltage of the load.

16. The method of claim 15, wherein the predetermined voltage value is a minimum rated voltage of the load, and the step of charging the capacitor coupled in parallel across an output of the DC to DC converter comprises the controller dynamically increasing the set point of the DC to DC converter to adjust the output voltage from the minimum rated voltage of the load to a maximum rated voltage of the load.

17. A system comprising:
a DC to DC converter being supplied by a power source, the DC to DC converter comprising an output configured for supply of an output voltage to a load;
a controller configured to monitor for a signal indicative of an imminent step change in the load, the imminent step change being greater than about an 85% change in load, and occurring in a period of time of about 5 milliseconds or less;
a capacitor coupled in parallel at the output of the DC to DC converter;
the controller configured to regulate the output voltage to one of a predetermined minimum rated voltage of the load, or to a predetermined maximum rated voltage of the load, or to a predetermined nominal rated voltage of the load, the output voltage regulated in dependence upon the signal indicative of the step change and the capacitor sized to supply power to the load during transition from the predetermined maximum voltage to the predetermined minimum voltage, or absorb power from the load during transition from the predetermined minimum voltage to the predetermined maximum voltage.

18. The system of claim 17, wherein the controller is configured to regulate the output voltage to the predetermined minimum rated voltage before the step change in the load occurs to prepare the capacitor to dynamically absorb power from the load during the transition of the output voltage, as a result of the step change, from the predetermined minimum voltage to the predetermined maximum voltage.

19. The system of claim 18, wherein the controller is configured to regulate the output voltage to the predetermined maximum rated voltage to prepare the capacitor to dynamically discharge power to the load during transition of the output voltage, as a result of the step change, from the predetermined maximum voltage to the predetermined minimum voltage.

20. The system of claim 17, wherein an output power of the DC to DC converter is equal to a peak power of the load.

* * * * *